I. F. WARME.
CAN CLOSING MACHINE.
APPLICATION FILED JULY 19, 1916.

1,332,785.

Patented Mar. 2, 1920.
12 SHEETS—SHEET 7.

I. F. WARME.
CAN CLOSING MACHINE.
APPLICATION FILED JULY 19, 1916

1,332,785.

Patented Mar. 2, 1920.
12 SHEETS—SHEET 10.

UNITED STATES PATENT OFFICE.

IVAR F. WARME, OF SYRACUSE, NEW YORK, ASSIGNOR TO CONTINENTAL CAN COMPANY, INC., OF SYRACUSE, NEW YORK, A CORPORATION OF NEW YORK.

CAN-CLOSING MACHINE.

1,332,785.   Specification of Letters Patent.   Patented Mar. 2, 1920.

Application filed July 19, 1916. Serial No. 110,178.

*To all whom it may concern:*

Be it known that I, IVAR F. WARME, a citizen of the United States, residing at Syracuse, in the county of Onondaga, State of New York, have invented certain new and useful Improvements in Can-Closing Machines, of which the following is a description, reference being had to the accompanying drawing and to the figures of reference marked thereon.

The invention relates to new and useful improvements in machines for marking a cover or end and subsequently applying and securing the end to the filled can.
An object of the invention is to provide a machine of the above character wherein the filled cans may have covers or can ends applied thereto, which can covers or can ends are secured to the can bodies by clenching, said covers or ends being applied and clenched to the can bodies during the continuous traveling of the can.

A further object of the invention is to provide a machine of the above character with means for marking the covers prior to the applying of the same to the cans.

A still further object of the invention is to provide a machine of the above character wherein filled cans are received from a suitable timing mechanism the covers are taken from a stack and are marked by indenting the metal with an identifying mark, after which the cover is placed over the filled can, seated in the can body and the seated cover and can rotated slowly and during the rotation of the said can end and can, said can end and can are caused to travel bodily and contact with a plurality of clenching rolls.

A still further object of the invention is to provide a combined marking and closing machine wherein the covers are taken from a stack by a positively operated device and wherein the cover just prior to being marked is advanced from contact with said positively operated device so as to permit a momentary dwell of the cover while the same is being marked.

A still further object of the invention is to provide a stack lifting device for lifting the stack off the can end just prior to the engagement of the can end or cover by the positively operated device which conveys the cover to the marking mechanism and thence to the cover applying and clenching mechanism.

These and other objects will in part be obvious and will in part be hereinafter more fully described.

In the drawings:—

Figure 1 is a side view of a machine embodying my improvements;

The invention consists primarily in an organized machine which is adapted to apply a cover to a filled can and clench the cover to the can body. The filled cans are taken directly from the filling machine and through a suitable timing mechanism are placed on a continuously rotating carrier. The covers are fed to the rotating carrier and supported above the filled cans by a half mold having a cover supporting ledge and then the filled cans are raised until the covers are seated therein. The covers are seated in the can bodies by a seating pad which moves down into contact with the covers and backs up the covers until the can bodies are raised and the cover is seated therein. This seating pad then moves up, holding the cover seated and the cover is chucked by a rotating chuck traveling bodily with the rotating carrier. The rotated can body with the cover seated therein is presented to the clenching roll which does not move with the carrier and as the cover passes this clenching roll the curved edge of the cover at a certain section thereon will be rolled underneath the flange of the can body. A second clenching roll then operates upon the curled edge of the cover at another section thereof for rolling the curled edge thereof under the flange on the can body. This is followed by the operation of a third clenching roll and the three clenching rolls clench the cover to the can body at three substantially equally spaced points, securely holding the cover on the can body, after which it is released from the chuck by the stripping pad which operates to strip the can from the chuck. After the above operations the closed can is removed from the machine by a suitable guide. The closed cans may be taken directly into a closing machine where the cover is double seamed to the body, if desired.

The covers are taken from a stack and in order to facilitate the removal of the covers, I have provided stack lifting devices which raise the stack from the lowermost cover. The covers are taken from the stack by a continuously and positively operated rotating disk having ledges which engage the covers and slide them along a support. Intermediate the stack and the point where the covers are placed on the can bodies, the covers are marked by dies which indent the metal, forming the identifying mark in the metal. In order that the cover may stop momentarily while the marking takes place, I have provided a yielding guiding finger which engages the cover and coöperating with the round edge of the cover forces the same forward away from the ledge carried by the positively operated cover feed and this brings the cover into contact with the yielding positioning dog which stops the cover long enough for the dies to operate on the cover to mark the same, after which the ledge on the cover feed again engages the cover and carries it forward and delivers it to the half mold on the clenching machine.

Figure 21:
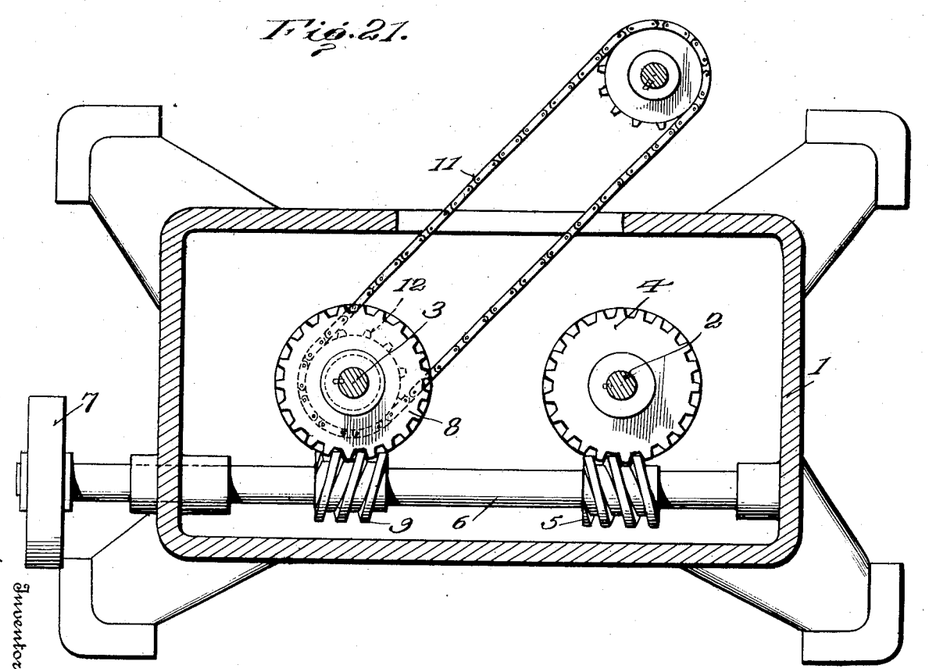
Fig. 21 is a view partly in plan and partly in section showing the driving mechanism for the cover feeding and marking device and for the clenching device and also the driving mechanism for the timer which presents the filled cans to the clenching device.

Referring more in detail to the drawings, my improved machine consists of a supporting base 1, see Fig. 21, in which are mounted two vertically rotating shafts 2 and 3. The shaft 2 is provided with a gear wheel 4 which meshes with a worm gear 5 on the main driving shaft 6. The main driving shaft may be operated by a suitable belt wheel 7. The shaft 3 is provided with a gear wheel 8 which meshes with a worm gear 9 on the shaft 6.

The rotating carrier which takes the covers from the stack holder presents the same to the marker and thence to the clenching machine, is mounted on the shaft 3, while the rotating carrier which receives the filled cans and the marked covers for clenching is mounted on the vertical shaft 2. The filled cans are fed to the carrier in proper timed relation so as to be received by the spaced half molds through a timing device which is operated by a vertical shaft 10 which is connected by a sprocket chain 11 to a sprocket wheel 12 on the shaft 3.

Figure 1:
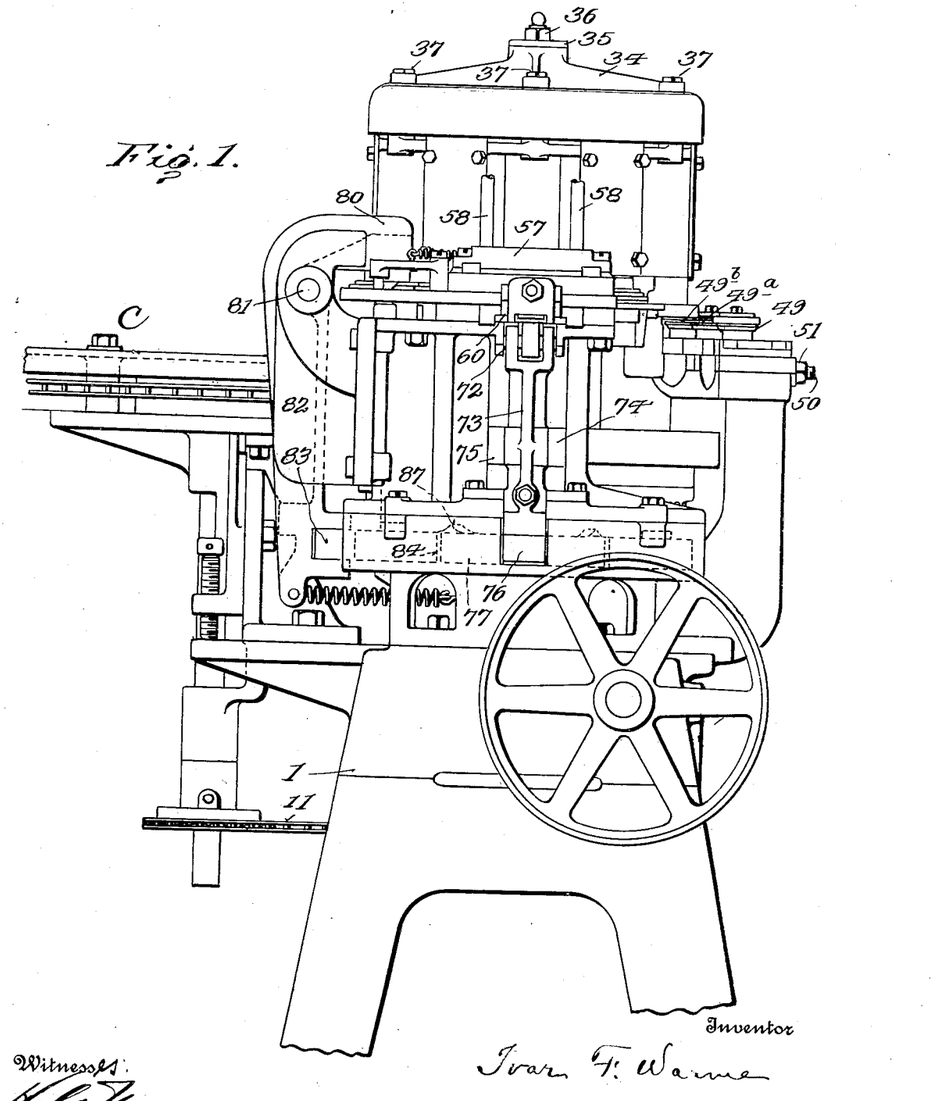
Figure 2:
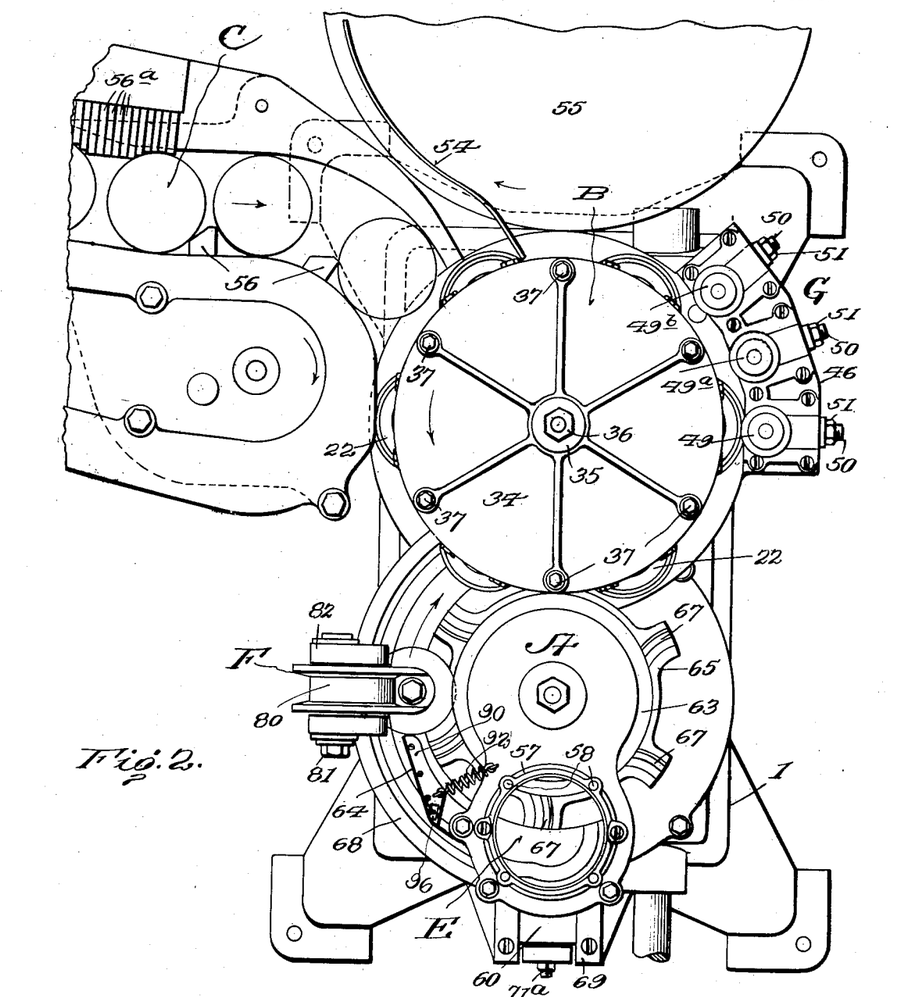
Fig. 2 is a plan view of the same.

Referring to Fig. 2, the cover marking and feeding mechanism is indicated at A, the clenching mechanism where the cover is applied to the can body and clenched thereto is indicated at B and the timing device is indicated at C. The stack holder is indicated at E, the marking mechanism is indicated at F and the clenching rolls are indicated at G.

Figure 3:
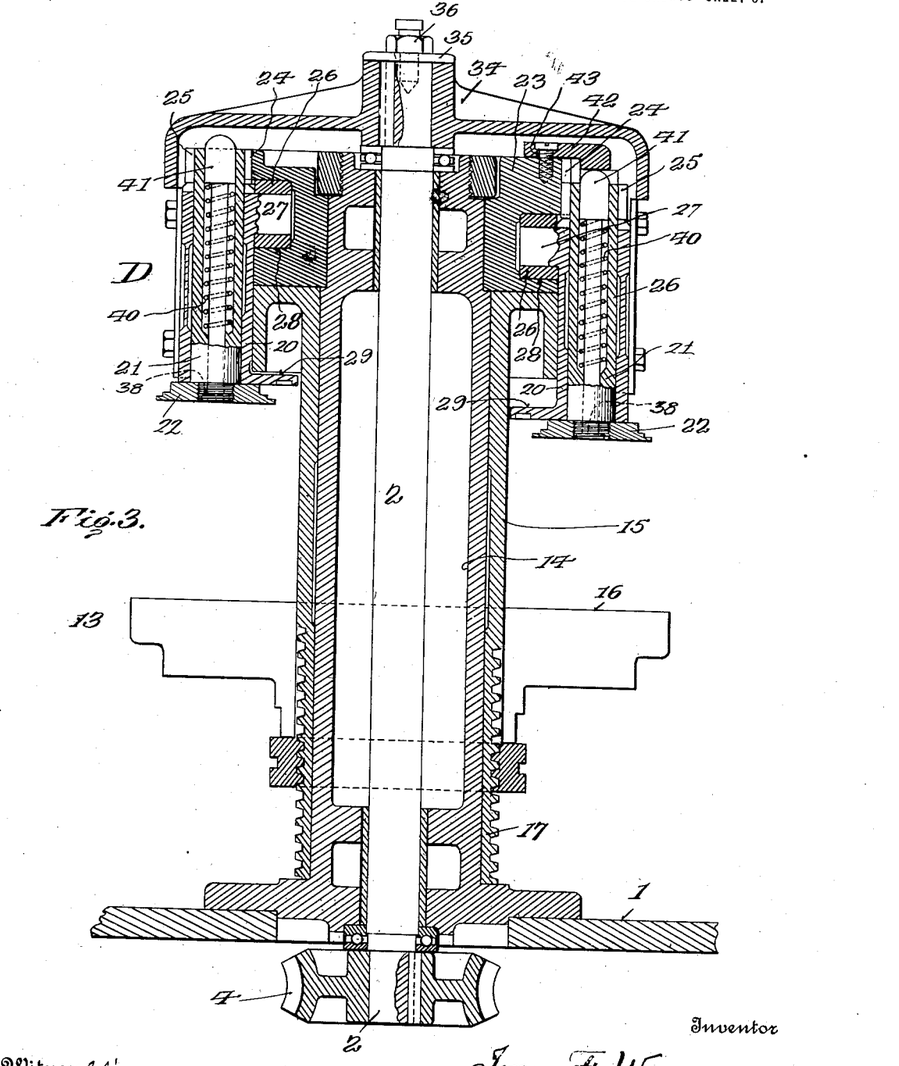
Fig. 3 is a view in vertical section through a portion of the clenching machine showing the means for raising and lowering the chucks and for rotating the chucks and also the means for operating the seating and tripping pad.
Figure 4:
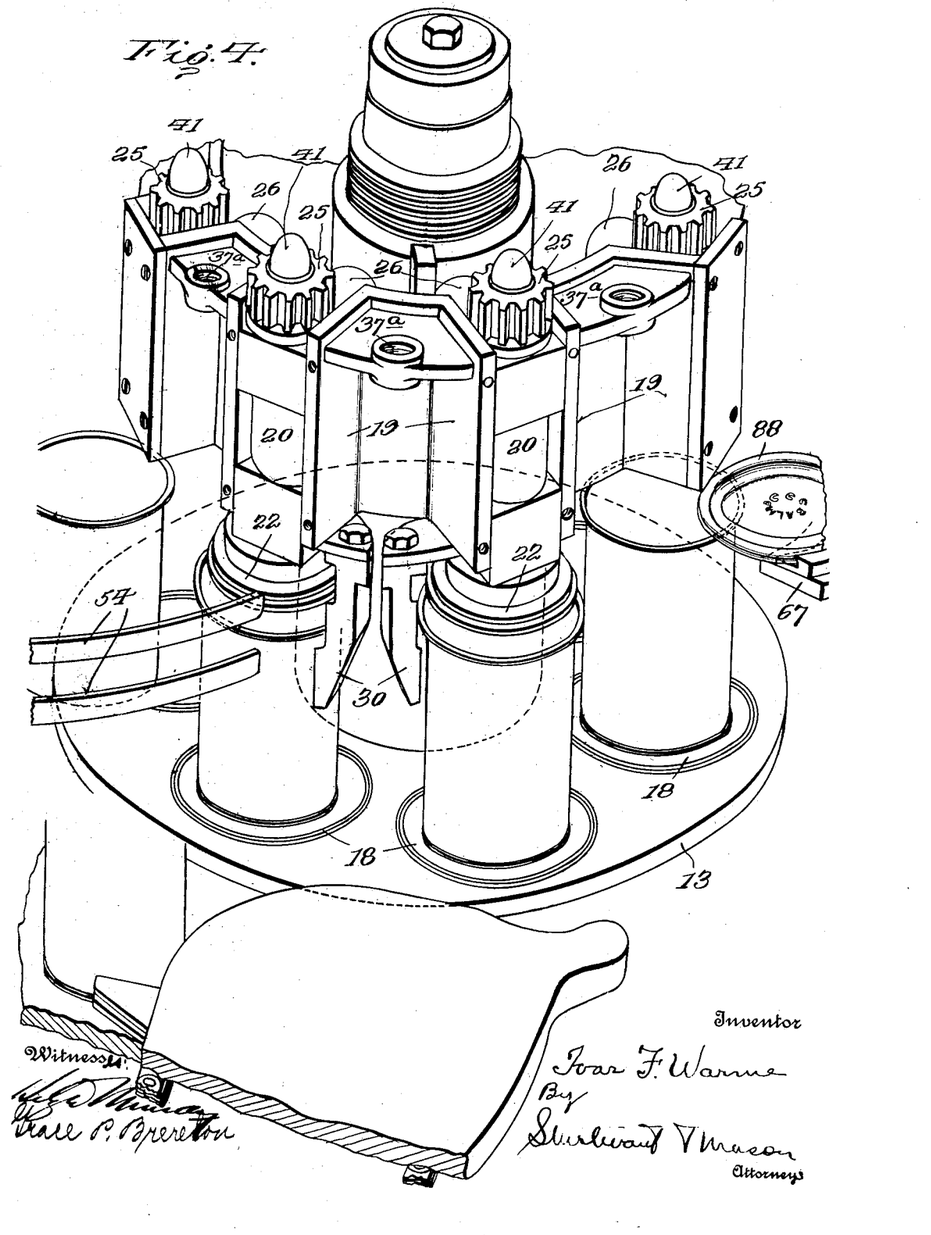
Fig. 4 is a perspective view showing a portion of the clenching machine and the means for stripping the cans, with the covers clenched thereon, from the machine.
Figure 19:
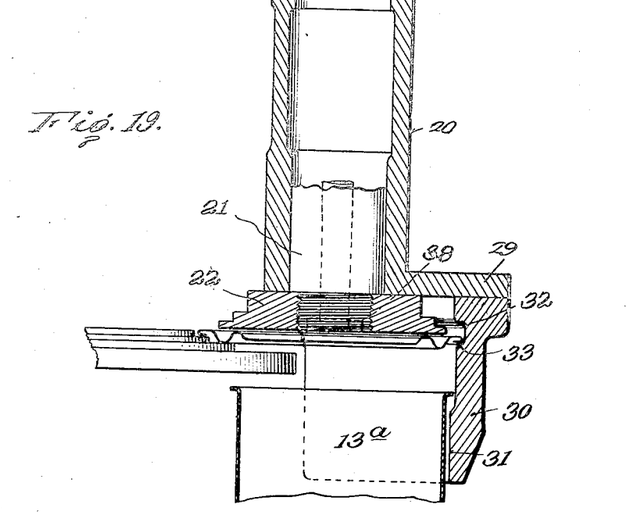
Fig. 19 is a vertical sectional view through one of the chucks and the centering mold showing a portion of the cover after placing the cover or end in the mold underneath the chuck.
Figure 20:
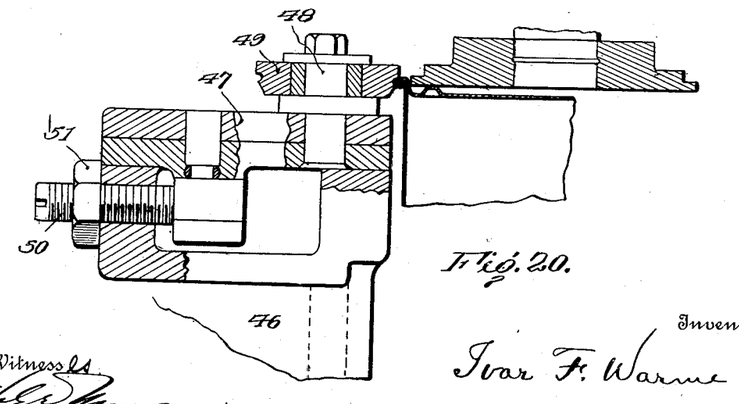
Fig. 20 is a detail showing one of the clenching rolls operating upon a can end held seated in the can body by the rotating chuck.

The clenching machine consists of a rotating carrier 13. The shaft 2 extends up through a fixed hollow column 14 which is secured to the supporting frame of the machine, see Fig. 3. Mounted to rotate about the fixed column 14 is a carrier 15 which is provided with a supporting table 16. The table is splined to the carrier and may be raised and lowered by a suitable nut meshing with a rack 17 carried by the carrier 16. The table 15 is formed with a plurality of supports 18, each of which is mounted on suitable ball bearings that they may freely rotate in the supporting table 16. Secured to the carrier 15 is a series of brackets 19. These brackets are bolted in any desired way to the carrier and rotate therewith. Between each adjacent pair of brackets is a sleeve 20. Rotatably mounted in each sleeve is a chuck support 21 which carries a chuck 22. Keyed to the column 14 and held from rotation is a stationary cam ring 23. This cam ring is formed with a gear 24 and each chuck support 21 has a gear 25 which meshes with the gear 24. The gear 24 is fixed, as above noted, and as the carrier rotates, carrying with it the brackets 19, and the chuck supports, the chucks will be caused to rotate through the gears 25 traveling on the gear 24. The gear 24 is much wider than the gear 25 through a portion of its extent so that the chuck support may be moved endwise. The chuck support is held from endwise movement in the sleeve 20 but the sleeve 20 is moved vertically through a roll 26 carried by a stub shaft 27 attached to the sleeve 20. The chuck support is held from endwise movement by the chuck at one end and the gear at the other end, which are attached to said support and extend over the ends of the sleeve 20. This roll runs in a cam groove 28 formed in the cam ring 23. The sleeve 20 is formed with a projecting ledge 29. About each chuck there is a half mold or guiding bracket 30 which is bolted to the ledge 29. This half mold 30 has a portion 31, see Fig. 19, which positions the filled cans, indicated at 13ª, in this figure, centrally underneath the chuck seat. The half mold is also provided with a recess 32 which forms a cover seat 33. Mounted on the upper end of the shaft 2 is a cap plate 34. This cap plate is splined to the shaft so as to rotate therewith and is held secured to the shaft by a washer 35 and a securing bolt 36. The cap plate 34 extends out over the traveling chuck supports and is secured in the brackets 19 by suitable bolts 37 which pass down through the cap plate in the bracket 19, said bolts being threaded into the openings 37ª, see Fig. 4. This cap plate serves as a means for transmitting the motion of the shaft 2 to the carrier 15. As the brackets 19 are rigidly attached to this carrier 15, as the shaft 2 rotates, the carrier, the supporting table and the chucks are rotated about the axis of the shaft.

Figures 22, 23:
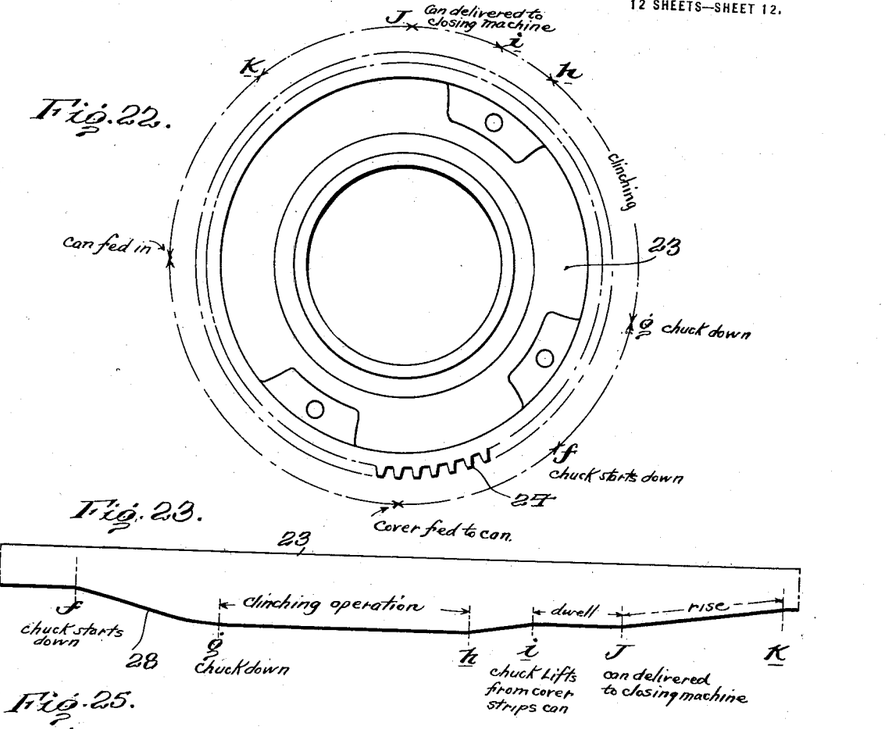
Fig. 22 is a plan view of the fixed gear and cam of the clenching device, indicating the operations performed in connection with the seating clenching of the can end to the can body.
Fig. 23 is a side view showing a development of the raising and lowering cam and indicating the different operations performed thereby.
Figures 24, 25:
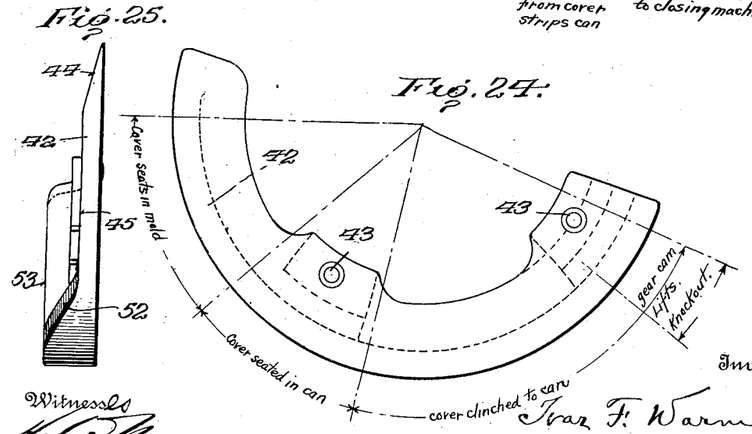
Fig. 24 is a plan view of the seating and knock out cam for controlling the seating and knock out pad.
Fig. 25 is an edge view of the same.

Each chuck has a recess in which is seated a pad 38. The pad is carried by a stem 39 which extends up through the chuck support. The chuck support is recessed to receive a spring 40 which surrounds the stem, carrying the seating pad. This spring bears against the shoulder on the head 41 and normally raises the seating pad so that it is housed within the recess of the chuck. Secured to the cam ring 23 is a cam plate 42. This cam plate is shown in detail in Figs. 24 and 25 of the drawings. The cam ring 23 is also shown in detail in Fig. 22 of the drawing. Bolts extending through the openings 43 in the cam plate, pass down into threaded openings in the cam ring and firmly secure this cam plate to the cam ring. The cam plate 42 engages the head 41 on the stem carrying the seating pad. Said cam plate has a face 44 which operates to force the seating pad downward out of the chuck and the face 45 holds the seating pad in this position. The parts are so timed that when the cover rests on the seating ledge in the half mold the seating pad will come down into engagement with the cover and backs it up. While the cover is thus held on its seat by the seating pad, the chuck support is moved downward through the roll 26 engaging the portion of the can between f and g Fig. 23. The cover is thus carried down and seated in the can body, the seating pad performing the seating operation while the chuck is still out of engagement with the cover. After the cover has been fully seated in the can body, the seating pad comes to rest but the chuck support moves still farther downward until the chuck engages the can body and this would cause the can end and can body to be rotated together. When the point g is reached the chuck is clear down and from the point g to the point h the can is rotated by the chuck. It is during this travel of the carrier that the can end comes into contact with the series of clenching rolls indicated at G in Fig. 2 of the drawing. These clenching rolls are carried by a bracket 46 secured to the main frame. Slidably mounted in the bracket 46 is a supporting plate 47 carrying a stud 48 on which the clenching roll 49 is journaled. The sliding plate 47 may be adjusted by a screw 50 which is held in adjusted positions by a lock nut 51.

As shown in the drawings, there are three clenching rolls 49, 49ª and 49ᵇ. These rolls are all similar in construction and similarly mounted and further description thereof is not thought necessary.

The can bodies are rotated as above noted, through the traveling of the gear on the chuck support on the fixed gear attached to the collar. As the chuck passes the first clenching roll 49, this clenching roll will operate upon a small portion of the curled part of the cover and roll it underneath the flange on the can body. Before the next roll 49ª is reached, the can has turned approximately one-third of a revolution so that the next clenching roll will operate upon another small portion of the curled part of the cover and likewise the can body is turned another one-third of a revolution before it is presented to the third clenching roll 49ᵇ, so that these three clenching rolls operate at three equally spaced points and thus securely hold the cover to the can body.

My improvement is particularly adapted to the securing of covers to can bodies which are afterward permanently attached thereto by double seaming. As a matter of fact it is the entire end of the can which is secured to the can body and I have used the term cover in describing the same with this understanding. I have also used the term can body as defining the can without the can end attached.

After the covers have been clenched to the can bodies the chuck support is lifted. The portion of the cam between the points h and i in Fig. 23 causes this lifting of the chuck and its support. The seating pad, however, is not raised at this time and, therefore, operates to strip the clenched can end and can body from the chuck. The cam section 52 moves the seating pad downward to seat the cover in the can body prior to the downward movement of the chuck through the action of the cam 23 and the straight section 53 on the cam plate 42 holds this seating pad at the extreme lower end of its movement so that it operates to perform this stripping operation above referred to. After the cover has been stripped from the chuck, then the can body is removed from the traveling support by a stripper guide 54, see Figs. 2 and 4. The can having the cover clenched thereto may be received on a rotating disk 55 which is part of a closing machine, or on any suitable feeding mechanism which will deliver these cans to a closing mechanism.

The filled cans are placed on the traveling table 13 by a timing device indicated at C in Fig. 2 of the drawings. This timing device consists of an endless carrier having spaced fingers 56. Coöperating with the spaced fingers are yielding devices 56ª which serve to place the filled cans against these fingers without stopping their forward travel and thus spilling the contents of the cans. These yielding devices 56ª are similar to those shown in patent granted to Taliaferro, Robinson and Coyle, 1,242,738, October 9, 1917. Suitable guides are provided for directing the filled cans so that these fingers 56 will place the filled cans on the table 13 and in the half mold above referred to.

Figures 5, 6:
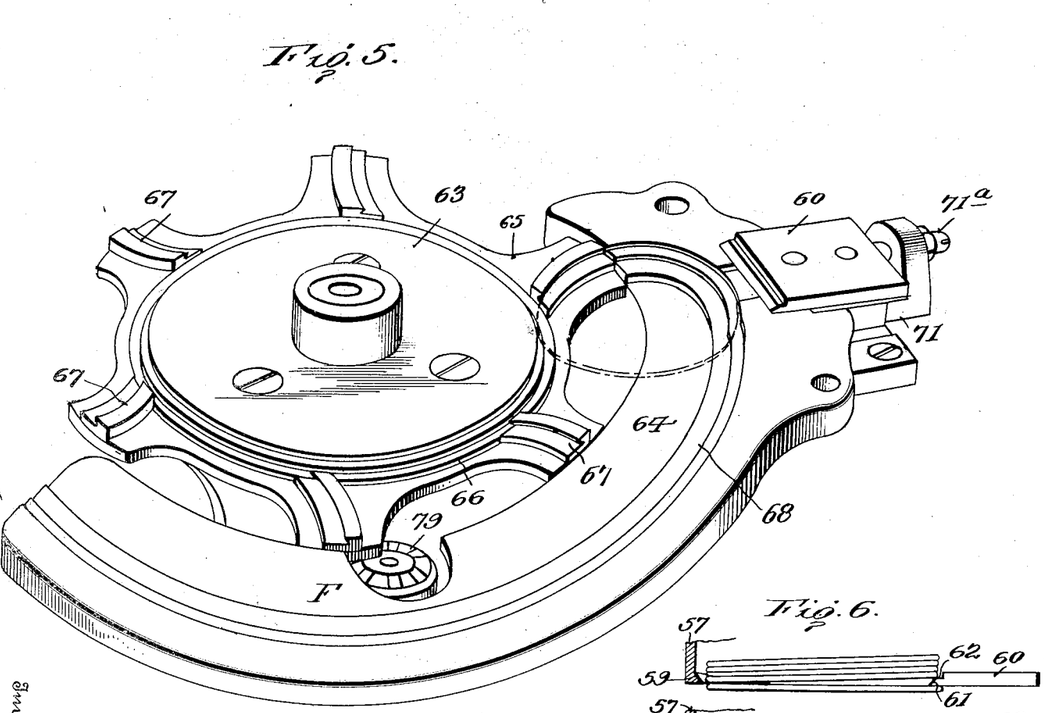
Fig. 5 is a perspective view of the cover support, the stack raising device and the positively operated cover feed;
Fig. 6 is a detail showing the insertion of the cover raising device between the foremost cover or can end and the stack.
Figure 7:
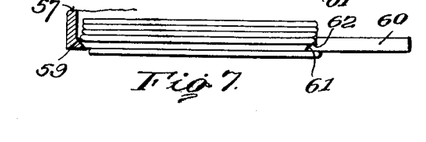
Fig. 7 is a similar view showing the stack raising device moved clear in and the stack 80 lifted from the lowermost cover or can end.
Figure 8:
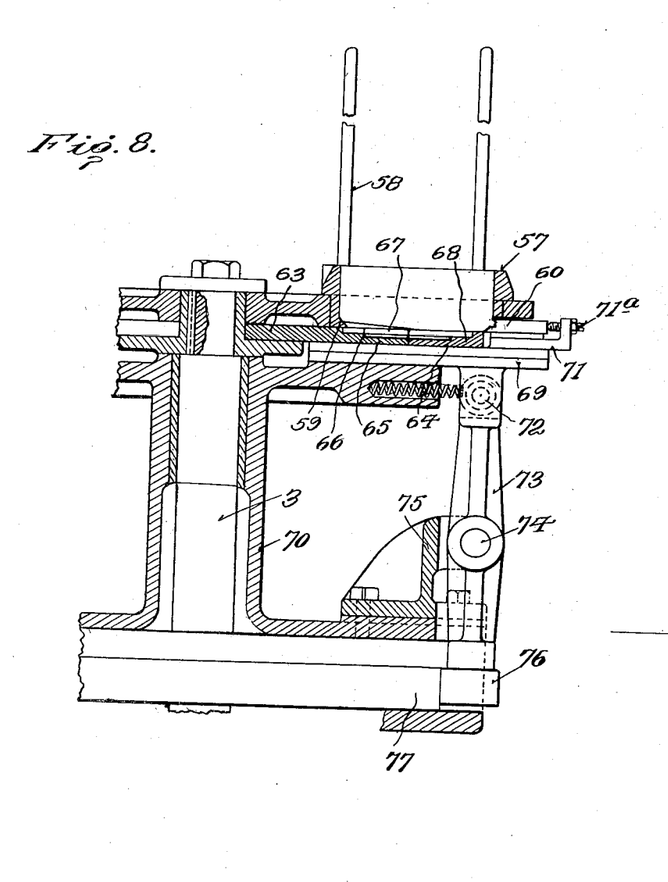
Fig. 8 is a vertical sectional view through the stack holder and a portion of the cover or can end feeding mechanism.
Figure 9:
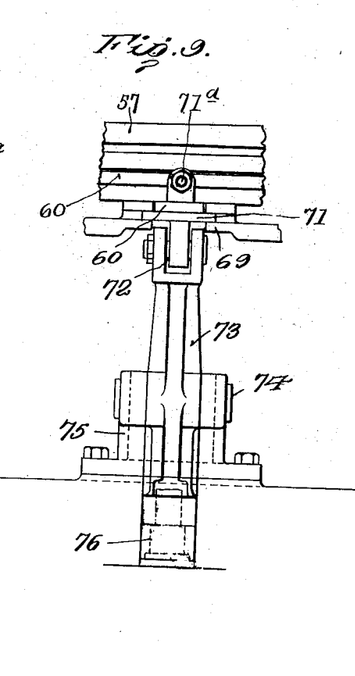
Fig. 9 is a side view of the stack raising device.
Figures 10, 11, 12:
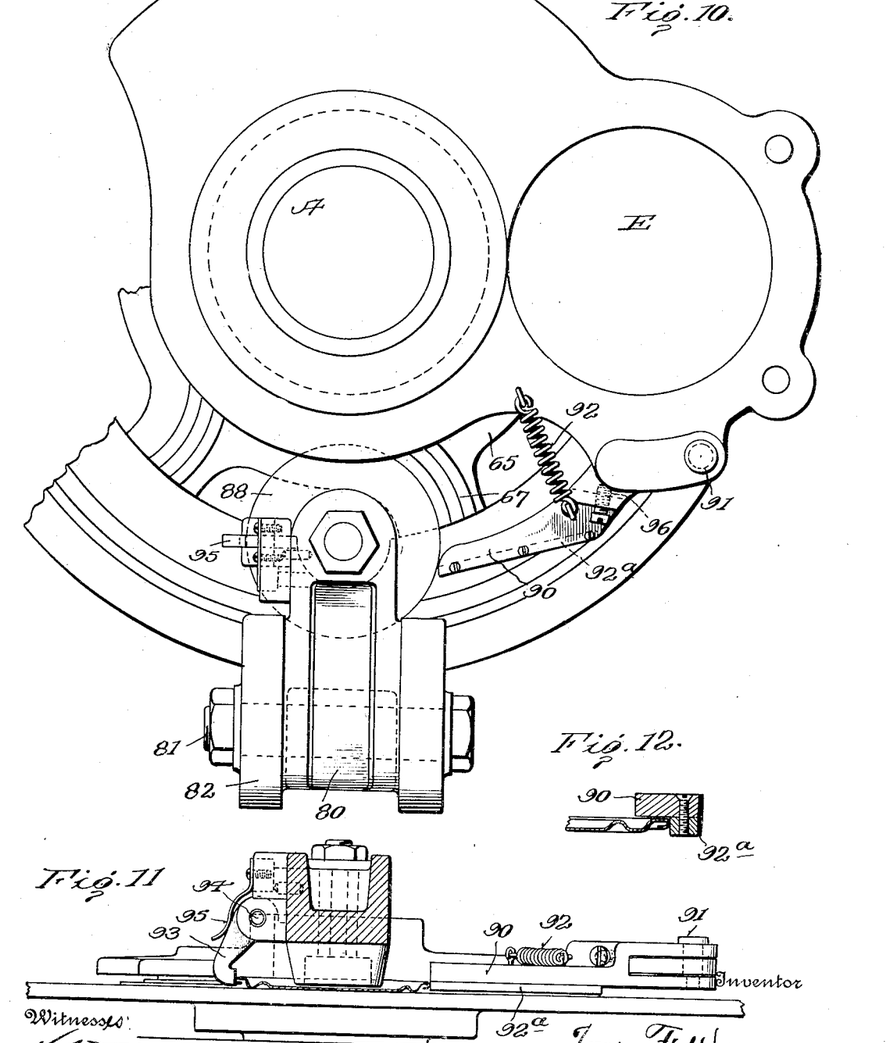
Fig. 10 is a detail in plan showing the cover support, the marking mechanism and the means for advancing the cover away from its positively driven feeding device to facilitate the marking.
Fig. 11 is a sectional view through the marking device showing the yielding dog for positioning the cover for marking.
Fig. 12 is a sectional view through the yielding cover guiding finger.
Figure 13:
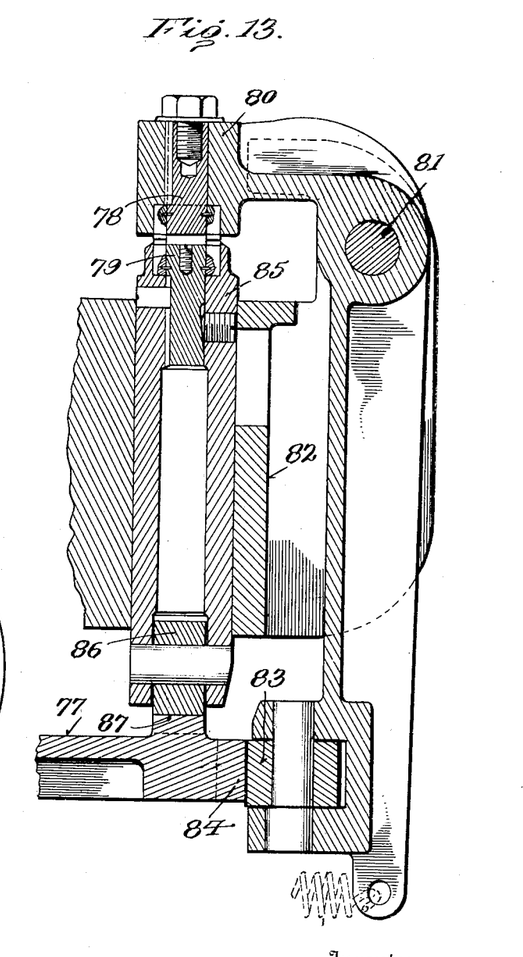
Fig. 13 is a view partly in section and partly in side elevation, showing the marking device and the cam for actuating the movable members of the marking device;
Figure 14:
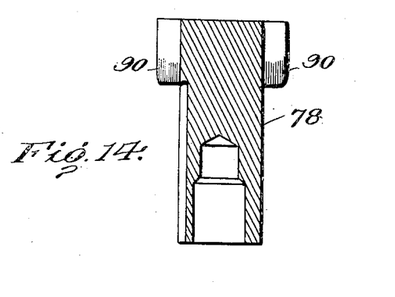
Fig. 14 is a vertical sectional view through the lower die holding head.
Figure 15:
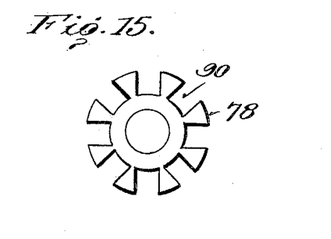
Fig. 15 is a plan view of the same.

The covers are taken from a stack indicated at E. Said stack of covers is placed in a stack holder consisting of a supporting base or ring 57 having upwardly projecting rods 58. This stack holder has a tapered supporting ledge 59 at one side thereof and a sliding plate 60 at the other side thereof. This sliding plate together with the tapered ledge serve as a stack raising means for separating the lowermost cover from the stack. The sliding plate 60 has a taper lip 61 and a supporting ledge 62. When the plate 60 is moved forward the tapered lip passes between the lowermost cover and the remaining covers in the stack as shown in Fig. 6. A continued forward movement of this plate 60 forces the cover separated from the lowermost cover up onto the ledge 62 and this forces the whole stack laterally carrying it up the tapered supporting ledge 59 and thus raising the whole stack from the cover, as clearly shown in Fig. 7.

Mounted on the shaft 3 is a cover feeding disk 63. Said cover feeding disk coöperates with a cover support 64. This disk is provided with a projecting ledge 65 having a shoulder 66 and also curved cover engaging ribs 67. These cover engaging ribs 67 are fixed to the disk 63 and are, therefore, positively operated. The cover support 64 has an outer guiding ledge 68. These ribs 67 pass underneath the stack holder and engage this lowermost separate cover and positively carry the same forward along the support 64. The cover will slide or roll along the guiding ledge 68.

The marking station is indicated at F in Fig. 5 of the drawings. The cover is brought to the marking station where it is marked and then passes farther along the support 64 and is finally delivered by the projecting ribs 67 into the half mold and onto the cover seat formed therein. The support 64 terminates adjacent the path of travel of the half molds so as the cover passes off the end of the support it will be received by the half mold and supported thereby until seated in the can body.

The sliding plate 60 is mounted on a guide 69. This guide 69 moves in suitable guide-ways in the frame 70 through which the shaft 3 extends. This frame 70 carries the cover support 64 which is suitably bolted thereto. The plate 60 is bolted to the guide 69 by bolts which pass through the elongated slots in the plate 71 and an adjusting screw 71ª serves as a means for adjusting the plate 60 after the securing bolts have been released. The guide 69 is pivotally connected by a pivot bolt 72 to a lever 73. The lever 73 is pivoted at 74 to the supporting bracket 75. There is a roller 76 at the lower end of the lever 73 and this roller coöperates with the cams on the cam disk 77 which is keyed to the shaft 3 of the cover feeding device.

Figure 17:
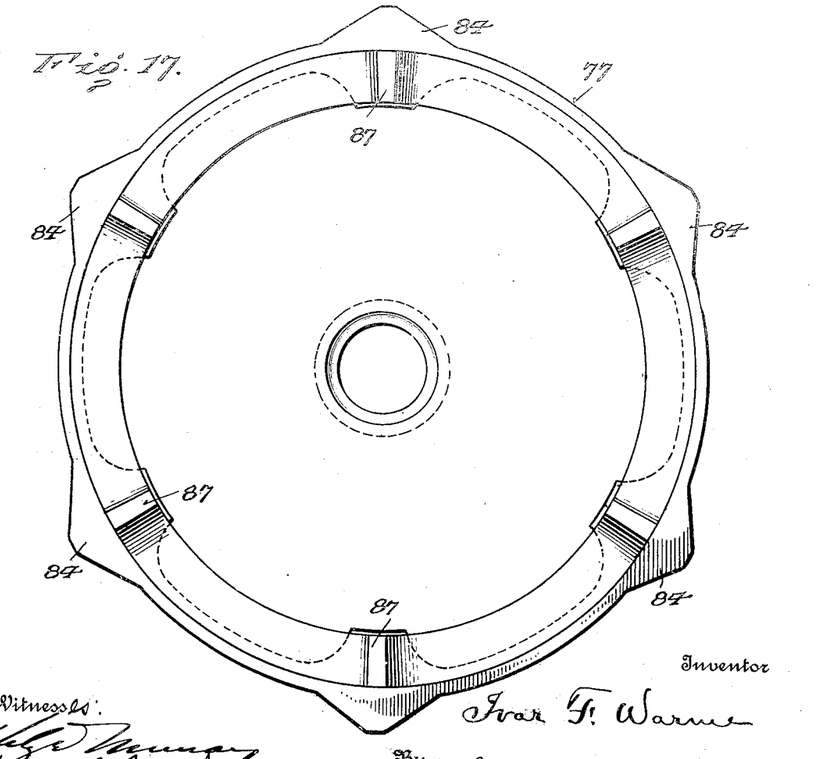
Fig. 17 is a plan view of the cam disk which carries the cams for operating the dies.
Figure 18:
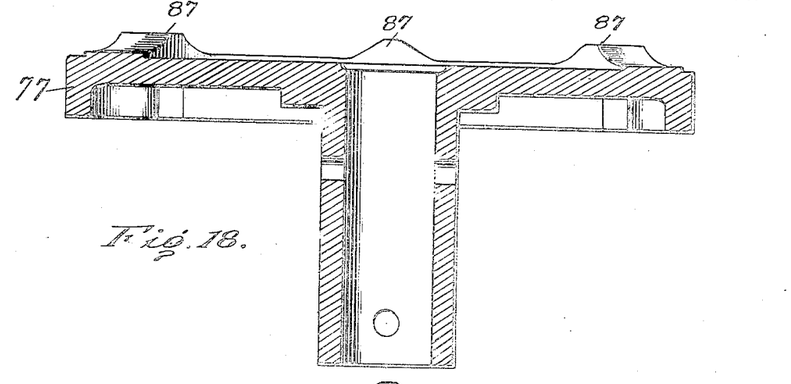
Fig. 18 is a vertical sectional view through the same.

It will be understood that there are a series of ribs 67 and these come into operation one after the other. As clearly shown in Fig. 17, there are a series of cams for actuating the lever 73 so that after a cover has been fed from the stack the plate 60 will be retracted, releasing the stack and permitting it to drop onto the support 64 and just before the next rib 67 engages the lowermost cover, the plate 60 is again moved inwardly, raising the stack to release the next lowermost cover.

The marking device consists of coöperating male and female dies, the male dies being carried by the die head 78 while the female dies are carried by the die head 79. The die head 78 is detachably secured to a lever 80 which is pivoted at 81 to a supporting bracket 82. The supporting bracket 82 is clamped to the frame 70 of the cover feeding device by suitable bolts. At the lower end of the lever 80 there is a roller 83 which is adapted to coöperate with the cams 84 of the cam disk 77. This swings the lever 80 about its pivot support 81. The lower die head 79 is carried by a sleeve 85 which is mounted to reciprocate vertically in the supporting bracket 82. A roller 86 is mounted at the lower end of this sleeve 85 and said roller is adapted to coöperate with the cams 87 on the cam disk 77. The cam disk 77, as above noted, is mounted on the main shaft 3 and as this cam disk rotates it will simultaneously raise the sleeve 85 in the lower die head and swing the lever 80 and thus lower the upper die head so that the two die heads are simultaneously moved in contact with the cover.

Figure 16:
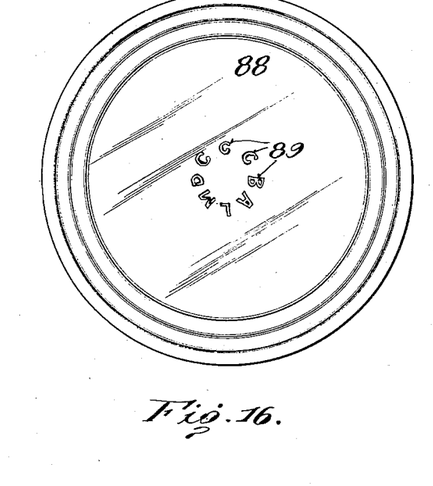
Fig. 16 shows a cover having an identifying mark placed thereon by an arrangement of dies supported by my improved head.

In Fig. 16 of the drawings, I have shown a cover indicated at 88 which has been marked by identifying marks indicated at 89. The die heads are formed with radial recesses 90 in which the dies are secured in any suitable way and these dies coöperate with each other through the movement of the die heads 78 and 79, to indent the metal forming the identifying marks therein.

As the covers are moved forward by the cover feeding mechanism they are caused to engage the yielding finger 90. This yielding finger 90 is pivoted at 91 to the cover support and a spring 92 secured at one end to the guiding finger 90 and at the other end to the frame normally forces the finger 90 inwardly toward the center of the machine. Said finger 90 has a guiding ledge 92ª on its lower face and as the covers are carried along they engage this guiding face which forces the covers against the ledge 66 on the cover feed. As the cover passes the end of the finger 90 said finger engaging the circular edge of the cover through its yielding action will force the cover forward away from the rib 67. The cover comes into engagement with a yieldable dog 93. Said dog is pivoted at 94 to the supporting bracket for the marking device and a spring 95 holds the dog in its forward position. When the cover engages this dog it is properly positioned for marking and the marking dies are so timed as to move at once into engagement with the cover and indent the same and then separate, releasing the cover and this occurs during this momentary dwell of the cover and until the ledge 67 has again caught up with the cover and positively moves the same forward. The dog 93 yields to allow the cover to be moved forward by the rib 67 when it engages the same.

An adjustable screw 96 carried by the finger 90 engages the stop and limits the inward movement of the finger 90.

From the above description it will be apparent that the covers will be positively taken one after another from a stack and the stack raised to permit ready withdrawal of the lowermost cover. As the covers are moved forward by this cover feed they will be advanced from the feeding rib of the cover feed by the yielding finger so that they may have a momentary dwell while the marking dies impress the cover, after which it is again carried along positively by the cover feed and placed on the cover seat of the half mold which centers the filled cans for receiving the cover. The covers are taken one after another from the stack by this positive cover feed and are then marked and loaded one after another into the traveling molds without stopping the molds in any way which move continuously with the carrier for the filled cans. The filled cans are fed in proper timed relation to the carrier which receives a can centers it underneath the cover, after which by a proper timed movement of the chuck and the seating pad the cover is seated in the can body and then the cover and can body are rotated, all during the continuous bodily travel of the can body so that the contents thereof is not split. While the cover and can body are rotated they are presented first to one clenching roll and then another and finally to a third clenching roll and the curled edge of the cover at certain points is rolled underneath the flange of the can body. After the covers have thus been secured to the can bodies then the covers are released from the chucks and discharged from the machine.

It will be understood that the cover applying and clenching means may be used if desired independently of the marking mechanism herein shown and described.

It will also be understood that other means may be used for clenching the covers to the can bodies.

It will also be understood that changes in the arrangement of the parts and details of construction may be made without departing from the spirit of the invention, as set forth in the appended claims.

Having thus described my invention, what I claim as new and desire to secure by Letters Patent, is—

1. The combination of a rotating carrier, means for placing filled cans in succession on said rotating carrier, means for applying a cover to each filled can, means for seating the cover in the can, a series of clenching rolls mounted on spaced axes fixed relative to the carrier, and means for rotating the can during the travel of the carrier at a speed whereby the clenching rolls engage the cover in succession and at spaced portions for clenching the cover at said spaced portions only to the body of the can.

2. The combination of a rotating carrier, means for placing filled cans on the rotating carrier as the carrier rotates, a stack holder, means for withdrawing a cover from the stack and placing the cover on the can and means for marking the cover on its way between the stack and the can and means stationary relative to the carrier for clenching the cover to the body of the can as the carrier rotates.

3. The combination of a rotating carrier, means for placing filled cans on the carrier, can body guides and cover supports mounted on and rotating with the carrier, means for placing a cover on the cover support as the carrier rotates, means for seating the cover in the can and for rotating the cover and can after the cover is seated therein and a series of clenching rolls mounted on axes fixed relative to the carrier and disposed so as to engage the cover in succession and at spaced intervals for clenching the cover to the body of the can while the said carrier is rotating.

4. The combination of a rotating carrier, means for placing filled cans on the carrier as it rotates, combined can body guides and cover supports, a rotatable chuck for each can, means for raising and lowering the chucks as the carrier rotates, means for feeding a cover to the cover support, means for seating the cover in the can body prior to the engagement wherewith by the chuck and a series of clenching rolls mounted on axes fixed relative to the carrier and disposed so as to engage the cover in succession and at spaced intervals for clenching the cover to the body of the can while the said carrier is rotating.

5. The combination of a rotating carrier, means for placing filled cans on the carrier as it rotates, a plurality of rotating chucks, a seating and stripping pad coöperating with each chuck, means for placing the cover between the chuck and the can, said seating pad operating to seat the cover, said chuck engaging the cover to rotate the cover and can, means stationary relative to the carrier for engaging the cover during the rotation of the carrier for clenching the cover to the can and means for operating the seating pad to strip the clenched cover and can from the chuck.

6. The combination of a rotating carrier, means for placing filled cans on the carrier as the carrier rotates, means associated with the carrier for seating a cover in each can and for securing the cover to the can, a stack holder, a rotating disk timed with the carrier for taking a cover from the stack holder and placing the same in the carrier in alinement with the seating means for placing the cover in the can, means for drawing the cover from the stack and placing the same on said disk and means for marking the cover while on the disk after it is withdrawn from the stack and prior to the delivering of the cover to the carrier, said means including coöperating dies for gripping and impressing an identifying mark in the cover.

7. The combination of a rotating carrier, means for placing filled cans on the rotating carrier, a cover support for each can, means for seating the cover in the can, means for clenching the cover to the can as the carrier rotates, a stack holder, means for withdrawing a cover from the stack holder and placing the same on a cover seat, and means for marking the cover on its way between the stack holder and the carrier.

8. The combination of a rotating carrier, means for placing filled cans on the rotating carrier, a cover support for each can, means for seating the cover in the can, means for clenching the cover to the can as the carrier rotates, a stack holder, means for separating the stack from the lowermost cover, means for withdrawing the lowermost cover, coöperating dies for marking the cover, said withdrawing means operating to present the cover first to the marking dies and then to a cover seat on the rotating carrier.

9. The combination of a rotating carrier, means for placing filled cans on the rotating carrier, a cover support for each can, means for seating the cover in the can, means for clenching the cover to the can as the carrier rotates, a stack holder, means for engaging a cover and positively withdrawing the same from the stack holder, coöperating marking dies for marking the cover, means for advancing the cover from its positive carrying means whereby the cover may be given a momentary dwell during the marking thereof, said withdrawing means operating to place the cover on a cover seat on the carrier.

10. The combination of a rotating carrier, means for placing filled cans on the rotating carrier, a cover support for each can, means for seating the cover in the can, means for clenching the cover to the can as the carrier rotates, a stack holder, means for withdrawing a cover from the stack and placing it on the support on the carrier, said means including a rotating disk, ribs carried thereby and operating in succession to withdraw the covers from the stack holder, marking dies coöperating to mark the cover and a yielding finger for engaging the cover and advancing the same away from the carrying rib for placing the cover between the dies whereby the cover may be caused to dwell while the dies are operating.

11. The combination of a rotating carrier, means for placing filled cans on the rotating carrier, a cover support for each can, means for seating the cover in the can, means for clenching the cover to the can as the carrier rotates, a stack holder, means for withdrawing the covers from the stack holder and placing the same on the cover supports on the carrier, said means including a rotating disk having projecting ribs for positively engaging the covers in succession, a spring finger for engaging the covers and advancing the same away from the ribs, a yielding dog for engaging the covers for momentarily arresting their forward movement and marking dies for engaging the cover while held by said dog.

12. The combination of a rotating carrier, means for placing filled cans on the rotating carrier, a cover support for each can, means for seating the cover in the can, means for clenching the cover to the can as the carrier rotates, a stack holder, means for withdrawing the covers from the stack holder and placing the same on the cover supports on the carrier, said means including a rotating disk having projecting ribs for positively engaging the covers in succession, a spring finger for engaging the covers and advancing the same away from the ribs, a yielding dog for engaging the covers for momentarily arresting their forward movement, marking dies for engaging the cover while held by said dog and means for raising the stack from the lowermost cover to facilitate the withdrawing of the cover.

13. The combination of a rotating carrier, means for placing filled cans on the rotating carrier, a cover support for each can, means for seating the cover in the can, means for clenching the cover to the can as the carrier rotates, a stack holder, means for withdrawing the covers from the stack holder and placing the same on the cover supports on the carrier, said means including a rotating disk having projecting ribs for positively engaging the covers in succession, a spring finger for engaging the covers and advancing the same away from the ribs, a yielding dog for engaging the covers for momentarily arresting their forward movement and marking dies for engaging the cover while held by said dog, a separating plate and means for reciprocating the same for separating the lowermost cover from the stack and for raising the stack to release the lowermost cover.

14. The combination of a rotating carrier, means for placing filled cans on the rotating carrier, a cover support for each can, means for seating the cover in the can, means for clenching the cover to the can as the carrier rotates, a stack holder, means for withdrawing the covers from the stack holder and placing the same on the cover supports on the carrier, said means including a rotating disk, ribs on said disk for positively engaging the covers in succession, spring means for advancing the covers away from the ribs whereby they may be given a momentary dwell, a yielding dog for causing the covers to dwell, positively operated coöperating dies for engaging the cover and marking the same while at a dwell.

In testimony whereof I affix my signature, in the presence of two witnesses.

IVAR F. WARME.

Witnesses:
LILLIAN W. TURNER,
ROBERT A. BLOOD.